United States Patent
Lai et al.

(10) Patent No.: US 7,596,567 B2
(45) Date of Patent: Sep. 29, 2009

(54) FILE REPAIR METHOD FOR MBMS AND UMTS NETWORK

(75) Inventors: Yen-Cheng Lai, Taipei County (TW); Lu-Tsung Chang, Taichung (TW); Phone Lin, Taichung (TW); Jason Yi-Bing Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 325 days.

(21) Appl. No.: 11/559,411

(22) Filed: Nov. 14, 2006

(65) Prior Publication Data

US 2008/0027989 A1    Jan. 31, 2008

(30) Foreign Application Priority Data

Jul. 31, 2006    (TW) ............... 95127934 A

(51) Int. Cl.
G06F 17/30    (2006.01)
G06F 7/00    (2006.01)
(52) U.S. Cl. ...................................................... 707/10
(58) Field of Classification Search .................... 707/10
See application file for complete search history.

(56) References Cited

U.S. PATENT DOCUMENTS 7,054,646 B2 *    5/2006    Naghian .................. 455/456.1
2004/0252691 A1 *    12/2004    Hori et al. .................... 370/390
2005/0086481 A1 *    4/2005    Winget ........................ 713/176
2006/0023732 A1    2/2006    Vedantham et al.
2007/0168708 A1 *    7/2007    McCuller ........................ 714/6
2008/0126088 A1 *    5/2008    Satt et al. ..................... 704/233

OTHER PUBLICATIONS

"Universal Mobile Telecommunications System (UMTS); Multimedia Broadcast/Multicast Service (MBMS); Architecture and functional description (3GPP TS 23.246 version 6.8.0 Release 6)" European Telecommunications Standards Institute, France, vol. 3-SA2, No. V680, Sep. 2005.
"3rd Generation Partnership Project; Technical Specification Group Services and System Aspects; Multimedia Broadcast/Multicast Service (MBMS); Protocols and codecs (Release 6)" 3GPP TS 26.346 V6.4.0, Mar. 2006.

* cited by examiner

*Primary Examiner*—Kuen S Lu
(74) *Attorney, Agent, or Firm*—Jianq Chyun IP Office

(57) ABSTRACT

A file repair method for Multimedia Broadcast Multicast Service (MBMS) and a UMTS network are disclosed. According to the method, a data structure is established according to a repair request message sent from a user equipment. Each repair block is multicast to the user equipment that requested it by using the original MBMS Bearer Service for file downloading according to the data structure. The present invention does not need any extra traffic and additional control signaling to allow each user equipment to receive required repair blocks.

18 Claims, 13 Drawing Sheets

FILE REPAIR METHOD FOR MBMS AND UMTS NETWORK

CROSS-REFERENCE TO RELATED APPLICATION

This application claims the priority benefit of Taiwan application serial no. 95127943, filed Jul. 31, 2006. All disclosure of the Taiwan application is incorporated herein by reference.

BACKGROUND OF THE INVENTION

1. Field of the Invention

The present invention relates to a file repair method for Multimedia Broadcast Multicast Service (MBMS). More particularly, the present invention relates to a file repair method for MBMS which is applicable to a Universal Mobile Telecommunications System (UMTS) network.

2. Description of Related Art

The multicasting technique (one-source-many-destination) is widely utilized for multimedia content delivery in the Internet. In the recent years, mobile telecommunication networks have been integrated with the Internet, and the Third Generation Partnership Project (3GPP) proposed the Multimedia Broadcast Multicast Service (MBMS) for multicasting multimedia content over the Universal Mobile Telecommunications System (UMTS), so as to save network resources on the core network and radio access network.

The MBMS system architecture based on the UMTS packet-switched service domain, including a Broadcast Multicast-Service Center (BM-SC) and a plurality of network nodes such as Gateway GPRS Support Nodes (GGSN), Serving GPRS Support Nodes (SGSN), and Radio Network Controllers (RNC). Wherein the BM-SC is connected to one or more GGSN, and the GGSN connected to the BM-SC is the downstream node of the BM-SC. Each GGSN is connected to one or more SGSN, and the SGSN connected to the GGSN is the downstream node of the GGSN. Each SGSN is connected to RNCs of the corresponding routing areas, and the RNCs in the routing areas are considered the downstream nodes of the SGSN. To improve the efficiency of the MBMS content transmission, 3GPP defines an MBMS Bearer Service to maintain the optimal delivery path of data transmission. The MBMS Bearer Service defines two context structures, MBMS Bearer Context and MBMS UE Context, stored in all network nodes involved in data transmission between the BM-SC and user equipments. Wherein MBMS Bearer Context describes the MBMS Bearer Service-specific information, such as multicast addresses, quality of service, and a list of the downstream nodes to which the current network node will transmit the MBMS content; while the MBMS UE Context stores the related information of a user equipment, which is created through the MBMS Multicast Service Activation procedure.

However, when an MBMS file is multicasted by the BM-SC to the user equipments, data loss or data corruption may occur due to bad wireless channel condition, network traffic congestion, or user mobility. Presently, the file repair mechanisms for MBMS specified by 3GPP can be categorized into unicast repair mechanism and multicast repair mechanism. When the user equipment held by a user confirms that the BM-SC has completed transmitting the file, the user equipment checks whether there is data loss or corruption in the MBMS file. If so, after a particular delay time, the user equipment sends a repair request message to the BM-SC through a TCP session. The repair request message is encapsulated by the HyperText Transfer Protocol (HTTP) GET method. The delay time is to prevent that many repair request messages are sent to the BM-SC at the same time. The BM-SC transmits the repair data requesting by the user equipment through unicast repair mechanism or multicast repair mechanism.

According to unicast repair mechanism, once the BM-SC receives a repair request message sent by the user equipment, the BM-SC replies a repair response message with the requested repair data to achieve the purpose of file repair. Referring to FIG. 1, after the user equipment 110 confirms that the BM-SC 120 has completed transmitting the file and finds a repair block 140 is lost by checking the received data file 130, the user equipment 110 sends a repair request message to the BM-SC 120. After receiving the repair request message, the BM-SC 120 sends the repair response message with the repair block 140 requesting by the user equipment 110 back to the user equipment 110, so as to complete the operation of file repair.

According to the multicast repair mechanism, after the BM-SC receives the repair request message, the BM-SC sends the repair response message with the Uniform Resource Identifier (URI) of a session description file (containing the bearer service information for transmitting repair blocks) back to the user equipment to notify the user equipment that the BM-SC will multicast the repair blocks to the user equipment in which MBMS Bearer Service. In the multicast repair mechanism, the BM-SC can determine whether to multicast the repair block to the user equipment in the original MBMS Bearer Service for file downloading or to request the user equipment to join another MBMS multicast group for receiving the repair block.

FIG. 2 is a diagram illustrating the multicast repair mechanism wherein an original MBMS Bearer Service for file downloading is used for sending repair blocks. After the user equipments 210, 220, and 230 have confirmed that the BM-SC 240 has completed transmitting the file, the user equipments 210 and 220 send repair request messages to the BM-SC 240 to notify the BM-SC 240 that the required data are repair block 213 and repair block 223 by checking the received data file 211 and data file 221, respectively. After a delay time, the BM-SC 240 starts to transmit the repair blocks 213 and 223 to all the user equipments through the MBMS Bearer Service established previously. Thus, the user equipment 230 also receives the repair blocks 213 and 223 that have been previously correctly received, and the user equipment 210 receives the unrequested repair block 223, similarly, the user equipment 220 receives the unrequested repair block 213.

FIG. 3 is a diagram illustrating the multicast repair mechanism wherein a new MBMS Bearer Service is used for sending repair blocks. After the user equipments 310, 320, and 330 confirms that the BM-SC 340 has completed transmitting the file. The user equipments 310 and 330 find that there are data loss by checking the MBMS files 311 and 331, respectively, and then send repair request messages to the BM-SC 340 to request the repair blocks 313 and 333. After receiving the repair request messages, the BM-SC 340 notifies the user equipments 310 and 330 in the repair response message that the repair blocks will be transmitted in another MBMS Bearer Service. Then the user equipments 310 and 330 have to use MBMS Multicast Service Activation procedure to join the new MBMS multicast group. After a particular delay time, the BM-SC 340 executes an MBMS Session Start procedure to establish all the bearer resources between the BM-SC 340 and the user equipments 310, 330. After establishing the bearer resources, the BM-SC 340 starts to transmit the repair blocks. In this file repair mechanism, the BM-SC 340 does not send the repair blocks (that have been previously correctly received) to the user equipment 320. However, the user equipments 310 and 330 still receive unrequested repair block.

As described above, while using unicast repair mechanism, the repair data is individually unicasted to the user equipment, and when a plurality of user equipments require the same data, the multiple copies of repair data are transmitted many times in the core network. In the multicast repair mechanism using original MBMS Bearer Service for file downloading, the data required by user equipment is multicasted to all the user equipments through the original MBMS Bearer Service for file downloading. Hence, it imposes unnecessary user equipment processing overhead and introduces unnecessary repair data transmission in the UMTS network. In addition, according to the multicast repair mechanism through new MBMS Bearer Service, all the user equipments that request repair blocks are required to join another MBMS multicast group, and the repair data is transmitted within the new MBMS Bearer Service, so that only those user equipments in the new MBMS group receive the repair data and network resources can be saved greatly. However, the user equipment has to spend a lot of signaling to join the new MBMS Bearer Service in this mechanism. All the three mechanisms described above may introduce extra network traffic and signal overheads in the UMTS network.

SUMMARY OF THE INVENTION

Accordingly, the present invention is directed to provide a file repair method for Multimedia Broadcast Multicast Service (MBMS). According to the method, a data structure is established according to a file repair request message sent by a user equipment, and then repair blocks are sent to the requesting user equipment according to the content of the data structure.

The present invention provides a Universal Mobile Telecommunications System (UMTS) network, wherein a data structure is established according to a file repair request message sent by a user equipment in the network, so that the user equipment only receive the requested repair blocks.

According to the present invention, the file repair method for MBMS is applicable to a UMTS network. The method includes following steps. First, a data structure is established according to the file repair request message sent by a user equipment in the UMTS network. Wherein the data structure stored in each of the network nodes consists of which downstream nodes of the network node is responsible to transmit which repair blocks. Then the BM-SC multicasts each repair block to the user equipments that require the repair block according to the data structure.

According to an embodiment of the present invention, the file repair method for MBMS further includes sending the repair blocks through an original MBMS Bearer Service for file downloading to the user equipment.

According to the file repair method for MBMS in an embodiment of the present invention, the data structure is distributed in each of the network nodes involved in the file repair, and the steps of establishing the data structure include: the BM-SC collecting the repair request messages, classifying these message to record each repair block required by which user equipments, and then distributing the repair information to each of the network nodes involved in the file repair so as to establish the data structure in the network node.

According to the file repair method for MBMS in an embodiment of the present invention, the step of establishing the data structure includes when each network node receives the repair request message, the data structure is established in the network node according to the received repair request message.

According to the file repair method for MBMS in an embodiment of the present invention, the network nodes include a BM-SC, Gateway GPRS Support Nodes (GGSN), Serving GPRS Support Nodes (SGSN), and Radio Network Controllers (RNC). Wherein the data structure of each network node involved in the file repair includes at least a sub-level data structure, each sub-level data structure indicates one of the repair blocks to be sent to downstream nodes by the network node, and each sub-level data structure further includes the identification of the corresponding repair block. The sub-level data structure in the BM-SC further includes all the downstream GGSNs which are responsible to send the corresponding repair block. Each sub-level data structure of the GGSN further includes all the downstream SGSNs which the corresponding repair block to be sent to. Each sub-level data structure of the SGSN further includes all the downstream routing areas where the corresponding repair block to be sent to. Each sub-level data structure of the RNC further includes all the downstream user equipments which require the corresponding repair block.

According to the file repair method for MBMS in an embodiment of the present invention, the BM-SC sends each repair block to all the downstream GGSNs in the sub-level data structure corresponding to the repair block. Each GGSN receives the repair block and sends each received repair block to all the downstream SGSNs in the sub-level data structure corresponding to the repair block. Each SGSN receives the repair block and sends each received repair block to all the RNCs of all the downstream routing areas in the sub-level data structure corresponding to the repair block. Each RNC receives the repair block and sends each received repair block to all the downstream user equipments in the sub-level data structure corresponding to the repair block.

According to the file repair method for MBMS in an embodiment of the present invention, when a user equipment moves to another routing area, the data structure in each of corresponding network nodes (before and after the user equipment moves) must be updated through a Routing Area Update procedure.

According to the file repair method for MBMS in an embodiment of the present invention, each sub-level data structure in the data structure of each network node further includes the identification of user equipments that request the corresponding repair block, so that the downstream network nodes in the data structure of the network node to be updated when the user equipment moves to another routing area can be determined.

According to the file repair method for MBMS in an embodiment of the present invention, the data structure of each network node further includes a repair block list which records the identification of the repair blocks required by each user equipment, so that the downstream network nodes of the data structure in the network node to be updated when the user equipment moves to another routing area can be determined.

According to another aspect of the present invention, a UMTS network is provided, which includes a plurality of network nodes and a data structure is stored in the network nodes. The data structure is established according to a repair request message sent by a user equipment in the UMTS network. The data structure stores a list of downstream nodes to which the current network node will transmit the corresponding repair block. The BM-SC only multicasts each repair block to user equipments requesting it according to the data structure, and the user equipments will not receive the repair blocks that have been previously correctly received.

According to the UMTS network in an embodiment of the present invention, the repair blocks are sent through an original MBMS Bearer Service for file downloading.

According to the UMTS network in an embodiment of the present invention, the BM-SC collects the repair request messages, classifies these messages to record repair blocks requested by the user equipments, and the BM-SC distributes the repair information to the network nodes involved in the file repair to establish a data structure in each of the network nodes.

According to the UMTS network in an embodiment of the present invention, when each network node receives the repair request message, the network node establishes the data structure according to the received repair request message.

According to the UMTS network in an embodiment of the present invention, besides the BM-SC, the network nodes further include GGSNs, SGSNs, and RNCs. The data structure of each network node includes at least a sub-level data structure. Each sub-level data structure indicates one of the repair blocks to be sent to the downstream nodes by the network node. Each sub-level data structure further includes the identification of the corresponding repair block. Each sub-level data structure of the BM-SC further includes all the GGSNs which the corresponding repair block to be sent to. Each sub-level data structure of GGSN further includes all the downstream SGSNs which the corresponding repair block to be sent to. Each sub-level data structure of SGSN further includes all the downstream routing areas where the corresponding repair block to be sent to. Each sub-level data structure of RNC further includes all the downstream user equipments require the corresponding repair block.

According to the UMTS network in an embodiment of the present invention, the BM-SC sends each repair block to all the GGSNs in the sub-level data structure corresponding to the repair block. Each GGSN receives the repair block and sends each received repair block to all the downstream SGSNs in the sub-level data structure corresponding to the repair block. Each SGSN receives the repair block and sends each received repair block to all the RNCs of all the downstream routing areas in the sub-level data structure corresponding to the repair block. Each RNC receives the repair block and sends each received repair block to all the downstream user equipments in the sub-level data structure corresponding to the repair block.

According to the UMTS network in an embodiment of the present invention, when a user equipment moves to another routing area, the data structure in each of corresponding network nodes (before and after the user equipment moves) is updated through the Routing Area Update procedure.

According to the UMTS network in an embodiment of the present invention, each sub-level data structure in the data structure of each network node further includes the identification of the downstream user equipments which require the corresponding repair block, so that the downstream network nodes in the data structure of the network node to be updated when the user equipment moves to another routing area can be determined.

According to the UMTS network in an embodiment of the present invention, the data structure of each network node further includes a repair block list which records the identification of the repair blocks required by each user equipment, so that the downstream network nodes in the data structure of the network node to be updated when the user equipment moves to another routing area can be determined.

According to the present invention, a data structure is established according to a repair request message sent by a user equipment, and repair data is sent to the user equipments (that request it) by using original MBMS Bearer Service according to the content of the data structure.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

These and other exemplary embodiments, features, aspects, and advantages of the present invention will be described and become more apparent from the detailed description of exemplary embodiments when read in conjunction with accompanying drawings.

According to the present invention, the file repair method for Multimedia Broadcast Multicast Service (MBMS) is a repair method when data loss or data corruption of a user equipment in a Universal Mobile Telecommunications System (UMTS) network occurs during MBMS content transmission due to bad wireless channel condition, network traffic congestion, or user mobility, etc. According to the method, a data structure recording how to transmit repair blocks is established according to a repair request message sent by each user equipment. Based on the data structure, the user equipment won't receive any unrequested repair block.

Figure 1:
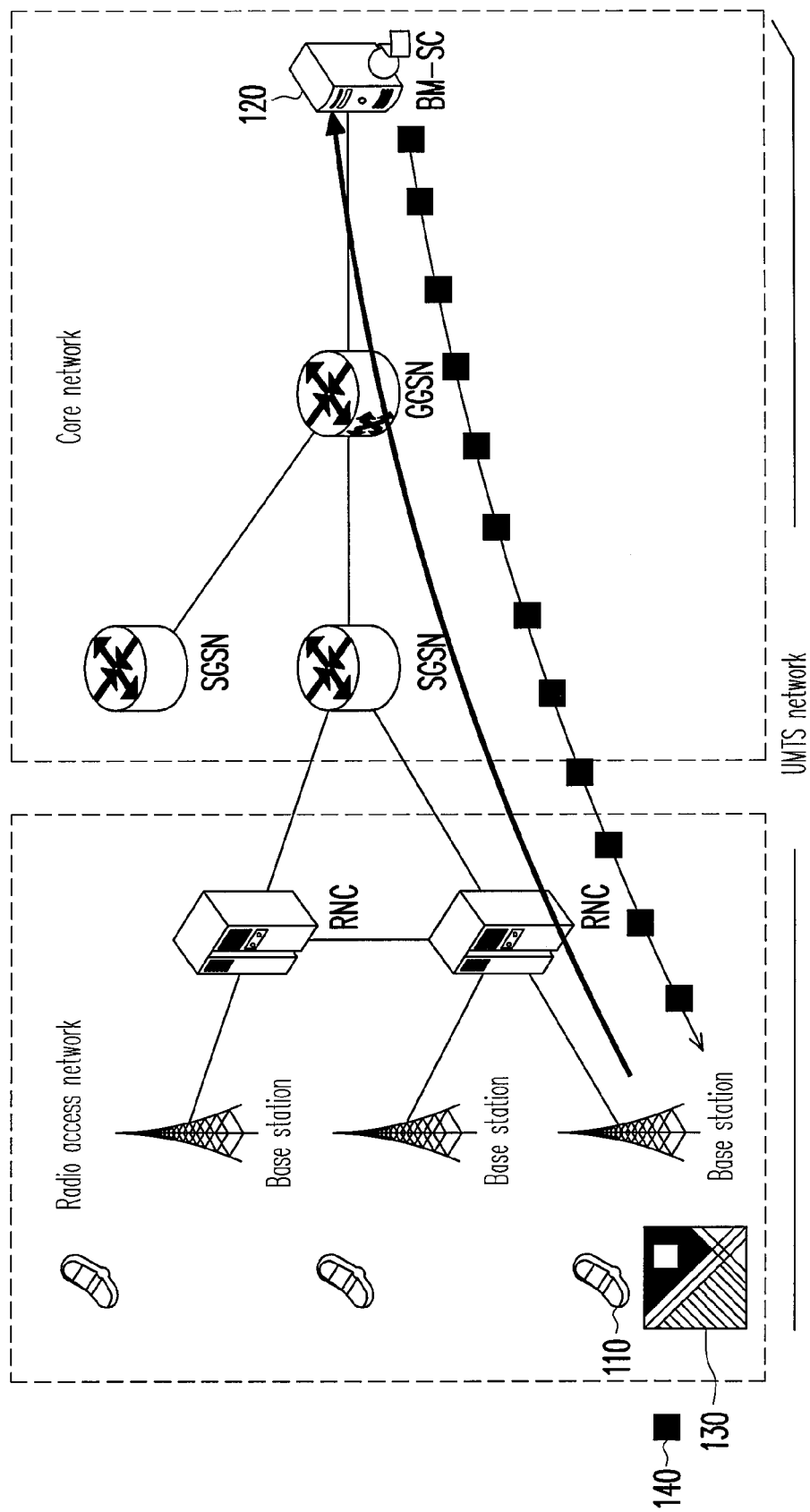
FIG. 1 is a diagram illustrating the unicast repair mechanism of Multimedia Broadcast Multicast Service (MBMS).
Figure 2:
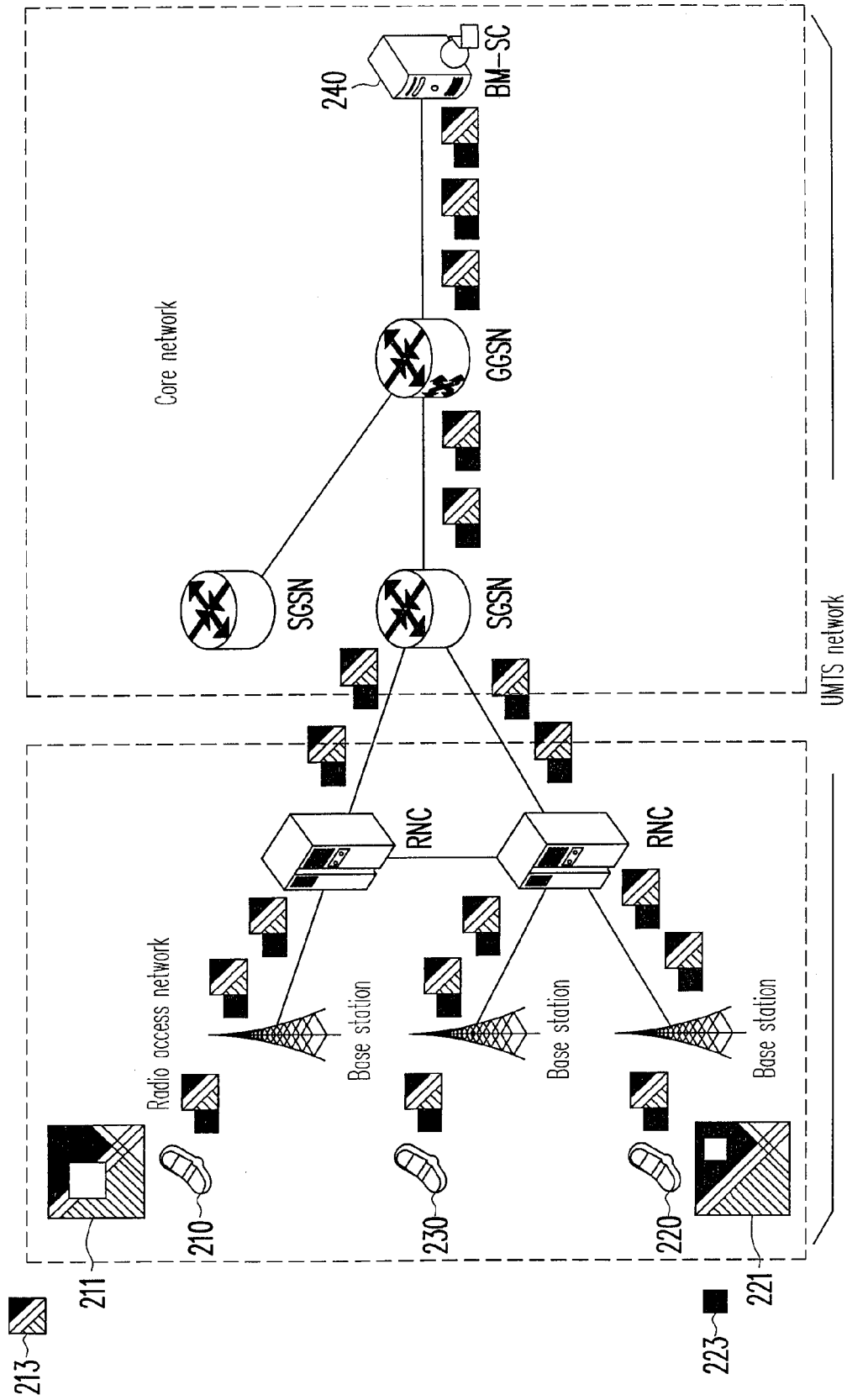
FIG. 2 is a diagram illustrating the multicast repair mechanism wherein an original MBMS Bearer Service for file downloading is used for sending repair blocks.
Figure 3:
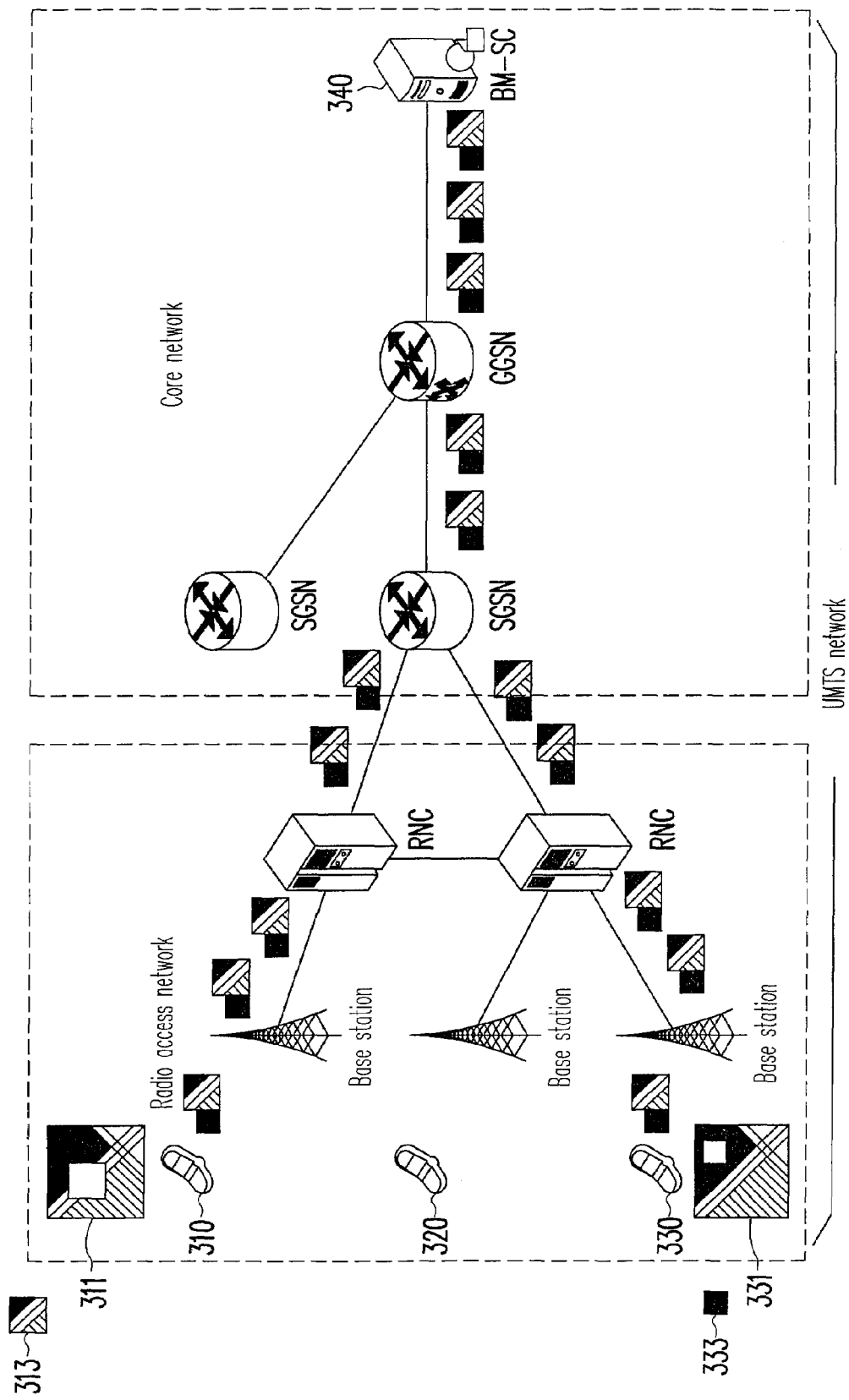
FIG. 3 is a diagram illustrating the multicast repair mechanism wherein a new MBMS Bearer Service is used for sending repair blocks.
Figure 4:
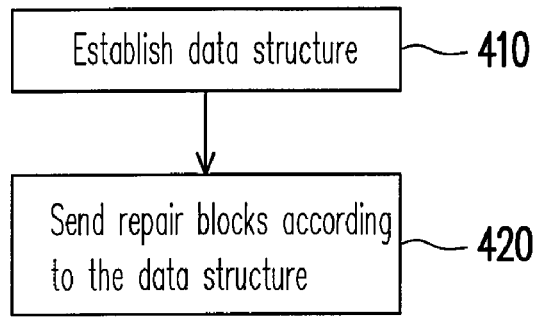
FIG. 4 is a flowchart illustrating the file repair method for MBMS according to an embodiment of the present invention.

FIG. 4 is a flowchart illustrating the file repair method for MBMS according to an embodiment of the present invention. Referring to FIG. 4, first, a data structure is established according to repair request messages sent by user equipments in the UMTS network. Wherein, the data structure stores a list of downstream nodes to which the current network node will transmit the corresponding repair block. Next, in step 420, the repair blocks are multicasted to the user equipments which require the repair blocks by the Broadcast Multicast-Service Center (BM-SC) of the UMTS network according to the established data structure. Based on the established data structure, the BM-SC won't send unrequested repair block to the user equipment. The present invention will be described in detail with two different methods of establishing the data structure.

Figure 5:
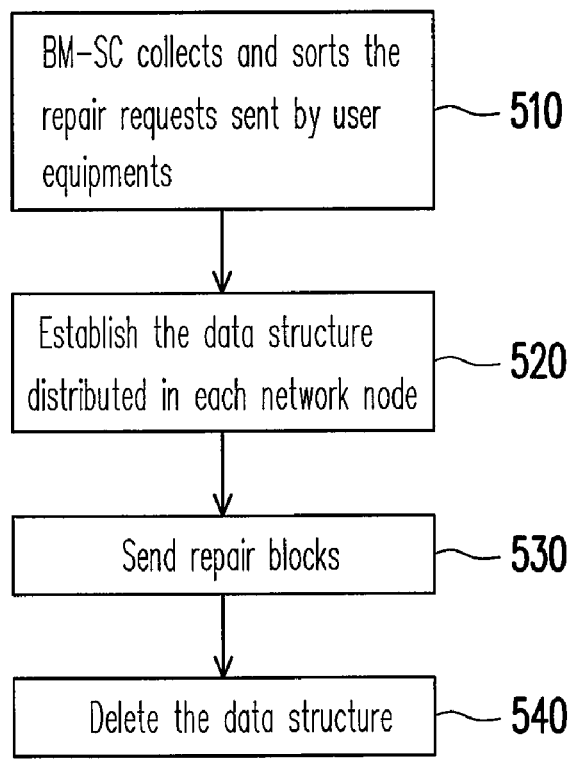
FIG. 5 is a flowchart illustrating an implementation of the file repair method for MBMS according to an embodiment of the present invention.

When the BM-SC in the UMTS network has finished sending files, each user equipment in the network determines whether there is data loss by cyclic redundancy check. FIG. 5 is a flowchart illustrating an implementation of the file repair method for MBMS according to an embodiment of the present invention. Referring to FIG. 5, when lost file blocks are determined, all the user equipments having lost data send repair request messages to BM-SC. Regarding each repair block, the BM-SC stores which user equipments require the repair block (step 510). According to the TS 26.346 standard specified by 3GPP, the content of a repair request message only shows the required file and the required repair blocks. When BM-SC receives the repair request message, it does not know the identity of the user equipment which issued the request. Thus, a "FROM" header having the format of IMSI@Operator has to be added into the repair request message, wherein IMSI is the International Mobile Subscriber Identity (IMSI) of the user equipment, and Operator is the telecommunication service provider. Accordingly, BM-SC can determine the identity of the user equipment according to the content of the header.

Figure 6:
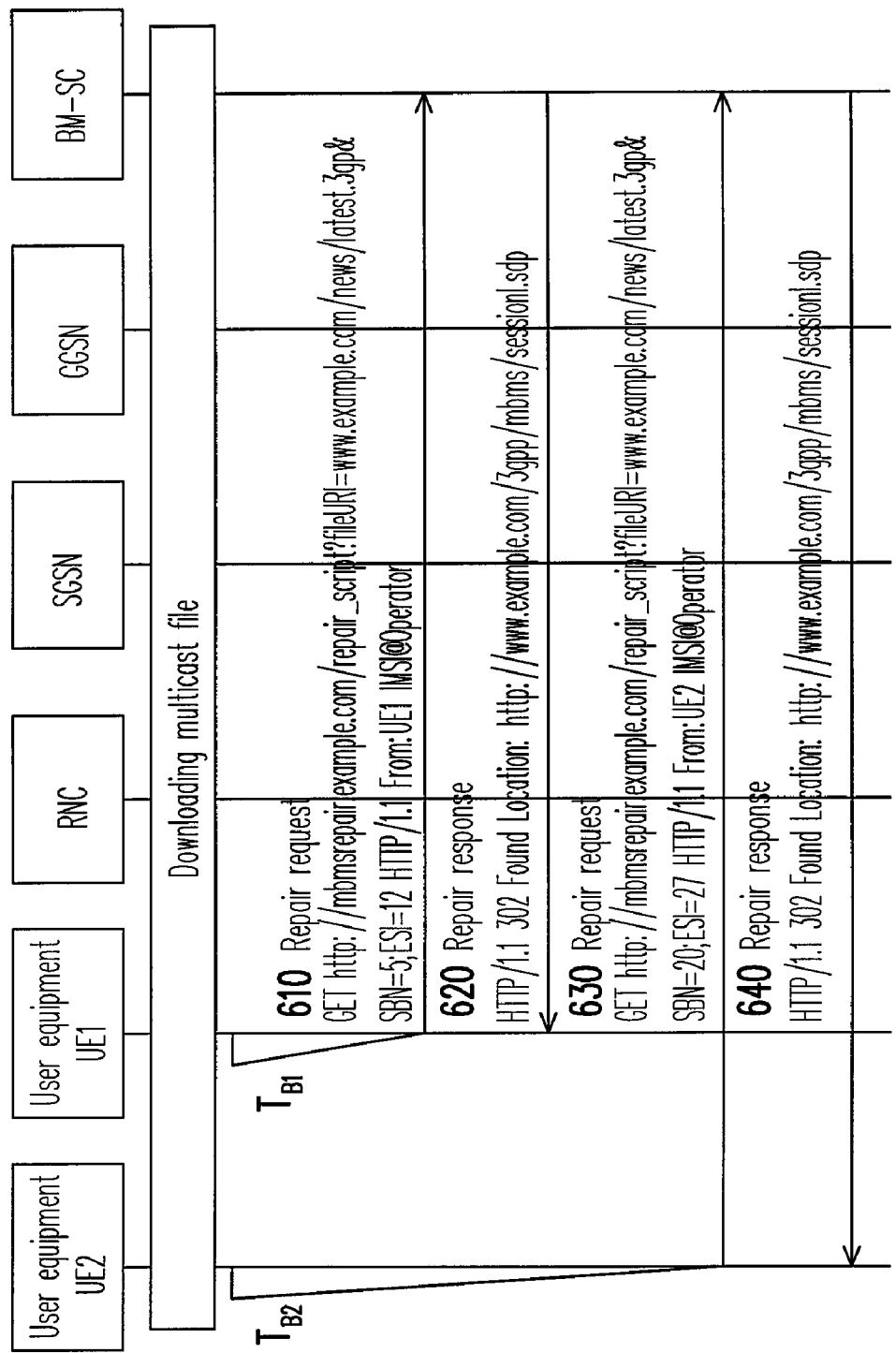
FIG. 6 is a flowchart illustrating a user equipment sending a file repair request message to a Broadcast Multicast-Service Center (BM-SC).

FIG. 6 is a flowchart illustrating a user equipment sending a file repair request message to the BM-SC. In the present embodiment, after MBMS file downloading, the user equipment UE1 waits for a delay time $T_{B1}$ and then sends a repair request message to BM-SC through a plurality of network nodes in the UMTS network (step 610). In the present embodiment, the http://mbmsrepair.example.com/repair_ script in the repair request message is the address for providing repair service, the file to be repaired is latest.3gp, and the URI thereof is at www.example.com/news. The required repair block is located at the $12^{th}$ Encoding Symbol Identifier (ESI=12) of the $5^{th}$ Source Block Number (SBN=5), and the IMSI of the user equipment UE1 is denoted in the "FROM" header.

After the BM-SC receives the repair request message sent by the user equipment UE1, the BM-SC stores the IMSI and the information in the repair request message of the user equipment UE1. Then the BM-SC replies a repair response message back to the user equipment UE1 (step 620), which contains the address of the session description to notify the user equipment UE1 of the MBMS Bearer Service to be used for transmitting repair data. After receiving the repair response message, the user equipment UE1 downloads the session description from the specified address. After the user equipment UE1 inspects the content of the session description, the user equipment UE1 identifies that the MBMS Bearer Service used to transmit repair data is the same as the original MBMS Bearer Service for file downloading. Thus, it is not necessary to join another MBMS multicast group. The UE1 waits in the original MBMS Bearer Service for receiving the repair data.

The user equipment UE2 sends a repair request message to the BM-SC after a delay time $T_{B2}$, in the present embodiment, the repair block required by user equipment UE2 is located at the $27^{th}$ Encoding Symbol Identifier (ESI=27) of the $20^{th}$ Source Block Number (SBN=20), and the IMSI of the user equipment UE2 is denoted in the "FROM" header (step 630). After BM-SC receives the repair request message from user equipment UE2, as shown in step 620, BM-SC stores the IMSI of the user equipment UE2 and the repair information in the repair request message. The BM-SC sends the repair response message with the address of the session description back to the user equipment UE2. The user equipment UE2 downloads the session description from the denoted address, and after inspecting the content thereof, UE2 understands that the original MBMS Bearer Service for file downloading is used to transmitting the repair data. Then UE2 waits in the original MBMS Bearer Service for receiving the repair data (step 640).

After BM-SC has collected all the repair request messages and has recorded the user equipments that require repair blocks, BM-SC delivers the repair information to the network nodes involved in file repair in the UMTS network to establish a data structure in each network node (step 520 in FIG. 5). The data structure of each network node includes more than one sub-level data structures, and the sub-level data structures respectively correspond to the repair blocks to be sent to downstream nodes. Each sub-level data structure further includes the identification of the corresponding repair block, a list of downstream nodes responsible for transmitting the repair block, and downstream user equipments requesting the repair block.

Figure 7:
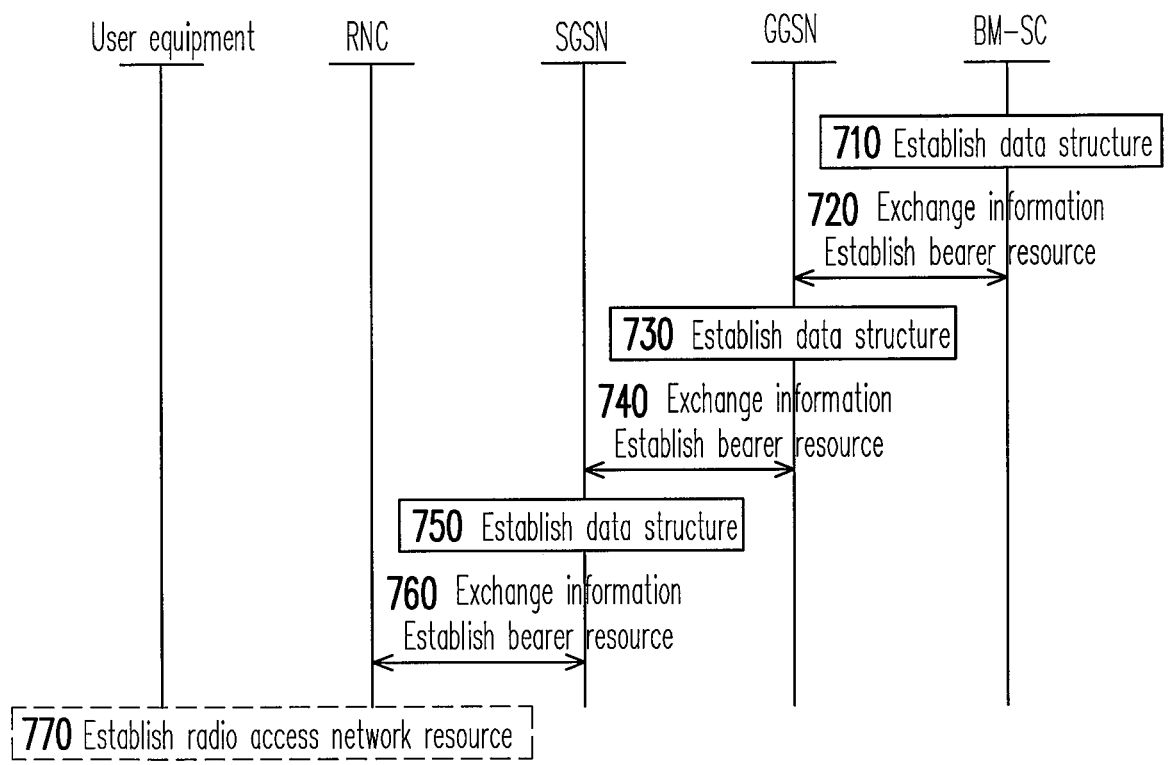
FIG. 7 is a flowchart illustrating establishing a data structure through MBMS Session Start procedure.

To explain clearly how to establish a data structure distributed in each network node, the following embodiment will be described as an example. FIG. 7 is a flowchart illustrating establishing a data structure through MBMS Session Start procedure. Referring to FIG. 7, in step 710, to determine each repair block should be sent to which GGSNs, BM-SC has to determine that the user equipment is served by which GGSN. However, this information is not contained in the standard specified by 3GPP. Thus, the GGSN used by each of user equipment is recorded by modified MBMS Multicast Service Activation procedure. When the GGSN sends an MBMS authorization request message to the BM-SC, the GGSN used by the user equipment can be obtained and the information is stored in the MBMS UE Context. When establishing the sub-level data structure corresponding to each repair block, the BM-SC checks that each user equipment is served by which GGSN, and then categorizes the user equipments according to different GGSNs, and BM-SC stores the information in the data structure therein.

Next, BM-SC exchanges information with GGSNs that need to send repair blocks to establish the required bearer resources (step 720). Besides, BM-SC sends the related repair information of the GGSN (for example, the information of the repair blocks and the user equipments requiring the repair blocks) to the GGSN.

In step 730, the GGSN obtains the repair information which repair blocks are to be sent and each repair block is required by which user equipments according to the file repair information received from the BM-SC. When establishing the sub-level data structure corresponding to each repair block, the MBMS UE Context stored in the GGSN has to be inquired to find out the SGSNs serving the user equipment. Next, the GGSN categorizes the user equipments according to the SGSNs and stores the result in the data structure of the GGSN. Thus, the GGSN can know precisely that each repair block has to be sent to which SGSNs.

The GGSN exchanges information respectively with the SGSNs which need to sent the repair blocks to establish the required bearer resource (step 740). The GGSN sends the repair information related to each SGSN (for example, the information of the repair blocks and the user equipments requiring the repair blocks) to the SGSN.

In step 750, the SGSN obtains the repair information which repair blocks are to be sent and each repair block is required by which user equipments according to the related information received from the GGSN. When establishing the sub-level data structure corresponding to each repair block, the routing area wherein the user equipment located is obtained by searching the MBMS UE Context stored in the SGSN, and then the user equipments are categorized according to the routing areas and the result is stored in the data structure in the SGSN. Accordingly, the SGSN can understand clearly that each repair block has to be sent to which routing areas.

In step 760, the SGSN determines the repair blocks have to be sent to which routing areas and sends the message to the corresponding RNCs of all the routing areas connected to the SGSN. The field of list of RAs in the message records all the routing areas wherein there are user equipments involved in file repair. Besides, the content stored in the data structure of the SGSN is also carried in the message and is sent to the RNC. After receiving the message, the RNC determines whether the routing area it serves exists in the list of RAs field. If the routing area served by the RNC exists in the list of RAs field, the RNC establishes the required bearer resource and stores the information related to the RNC (for example, information of the repair blocks and the user equipments requiring the repair blocks) in the data structure of the RNC, and then responds to the SGSN. If the served routing area does not exist in the list of RAs field, the RNC ignores the message. Finally, in step 770, the RNC establishes the radio access network resources for transmitting repair data to user equipments.

Figure 8:
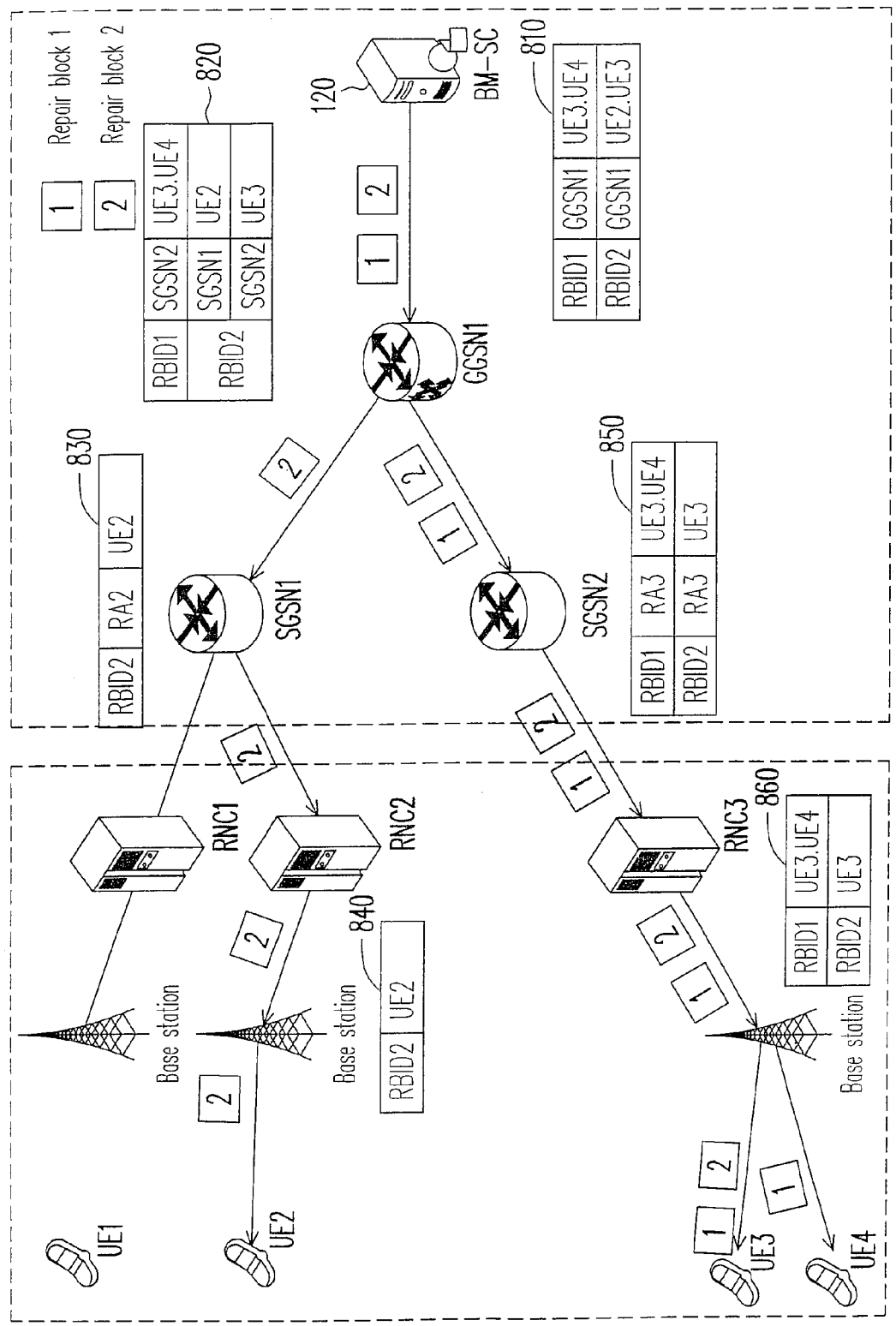
FIG. 8 is a diagram of a Universal Mobile Telecommunications System (UMTS) network according to an embodiment of the present invention.

FIG. 8 is a diagram of a UMTS network according to an embodiment of the present invention. In the present embodiment, it is assumed that lost data in file downloading occur to the user equipments UE2, UE3, and UE4. Wherein the user equipment UE2 requires repair block 2, the user equipment UE3 requires repair block 1 and repair block 2, and the user equipment UE4 requires repair block 1. The data structure stored in each network node and established with the foregoing procedure will be explained in detail in the present embodiment.

Referring to FIG. 8, the data structure 810 established and stored in the BM-SC includes two sub-level data structures respectively corresponding to the repair block 1 and the repair block 2. The sub-level data structure corresponding to the repair block 1 records the identification code RBID1 of the repair block 1, the downstream node GGSN1 which needs to send the repair block 1, and the user equipments which request the repair block 1 (i.e., user equipment UE3 and user equipment UE4). The sub-level data structure corresponding to the repair block 2 records the identification code RBID2 of the repair block 2, the downstream node GGSN1 which needs to send the repair block 2, and the user equipments which require the repair block 2 (i.e., user equipment UE2 and user equipment UE3).

The data structure 820 established with foregoing procedure and stored in the GGSN1 includes two sub-level data structures respectively corresponding to repair block 1 and repair block 2. The sub-level data structure corresponding to the repair block 1 records the identification code RBID1 of the repair block 1, the downstream node SGSN2 which needs to send the repair block 1, and user equipments which require the repair block 1 (user equipment UE3 and user equipment UE4). The sub-level data structure corresponding to the repair block 2 records the identification code RBID2 of the repair block 2, and the downstream nodes which need to send the repair block 2 are SGSN1 and SGSN2. Wherein the user equipment which is served by SGSN1 and requires the repair block 2 is the user equipment UE2, and the user equipment which is served by SGSN2 and requires the repair block 2 is the user equipment UE3.

The data structure 830 established and stored in the SGSN1 includes a sub-level data structure corresponding to the repair block 2. The sub-level data structure corresponding to the repair block 2 stores the identification code RBID2 of the repair block 2, the routing area RA2 which needs to send the repair block 2, and the user equipment UE2 which requires the repair block 2. The data structure 850 established and stored in SGSN2 includes two sub-level data structures respectively corresponding to the repair block 1 and the repair block 2. The sub-level data structure corresponding to the repair block 1 records the identification code RBID1 of the repair block 1, the downstream nodes (routing area RA3) which need to send the repair block 1, and the user equipments which require the repair block 1 are user equipment UE3 and user equipment UE4. The sub-level data structure corresponding to the repair block 2 records the identification code RBID2 of the repair block 2, the downstream node (routing area RA3) which need to send the repair block, and the user equipment which requires the repair block 2 is user equipment UE3.

The data structure 840 established and stored in RNC2 includes a sub-level data structure corresponding to repair block 2. The sub-level data structure corresponding to repair block 2 stores the identification code RBID2 of the repair block 2 and user equipment UE2 which requires the repair block 2. The data structure 860 stored in RNC3 includes two sub-level data structures corresponding to repair block 1 and repair block 2. The sub-level data structure corresponding to repair block 1 records the identification code RBID1 of repair block 1 and the user equipments which require the repair block 1 are user equipment UE3 and user equipment UE4. The sub-level data structure corresponding to repair block 2 records the identification code RBID2 of the repair block 2, and the user equipment which requires the repair block 2 is user equipment UE3.

As shown in step 530 of FIG. 5, after establishing the data structure on each network node involved in the file repair, BM-SC multicasts the repair blocks to the user equipments according to the established data structures. It should be mentioned here that in the present embodiment, the repair blocks are transmitted with the original MBMS Bearer Service for file downloading, and the transmission procedure thereof will be described below.

Referring to FIG. 8, first, BM-SC searches the sub-level data structures corresponding to the repair block 1 and the repair block 2 in the data structure 810, respectively. The BM-SC determines that the downstream node to which BM-SC needs to send repair block 1 is GGSN1, and the user equipments which require the repair block 1 are user equipment UE3 and user equipment UE4. Thus BM-SC sends the repair block 1 to GGSN1, while the downstream node that BM-SC needs to send the repair block 2 to is GGSN1, and the user equipments which require the repair block 2 are user equipment UE2 and user equipment UE3, thus BM-SC sends the repair block 2 to GGSN1.

GGSN1 receives data sent by BM-SC (for example, the repair blocks 1 and 2), and continues to send the repair blocks to the downstream nodes thereof according to the data structure 820. With the transmission of repair block 2 as example, GGSN1 inspects the sub-level data structure corresponding to repair block 2 in the data structure 820, and the result shows that the repair block 2 has to be sent respectively to SGSN1 and SGSN2, thus GGSN1 sends the repair block 2 to SGSN1 and SGSN2.

Next, with SGSN1 as example, after receiving the data sent by GGSN1, SGSN1 sends the repair block 2 to the routing area RA2 according to the sub-level data structure corresponding to repair block 2 in the data structure 830. It is assumed here that the RNC of routing area RA2 is RNC2, thus, the repair block 2 is sent to RNC2.

With RNC2 as example, RNC2 gets to know that the user equipment which requires the repair block 2 is user equipment UE2 by inspecting the sub-level data structure corresponding to repair block 2 in the data structure 840, thus, RNC2 sends the repair block 2 to the user equipment UE2.

In the present embodiment, SGSN2 and RNC3 also send the repair block 1 to the user equipments UE3 and UE4 and the repair block 2 to the user equipment UE3 in the same way.

Referring to FIG. 5 again, when BM-SC determines that there will be no data to be transmitted for a long time, BM-SC performs an MBMS Session Stop procedure to stop the MBMS session and release all the reserved resources. As shown in step 540, at executing the procedure, BM-SC deletes the data structures established in all the network nodes for transmitting repair blocks.

Figure 9:
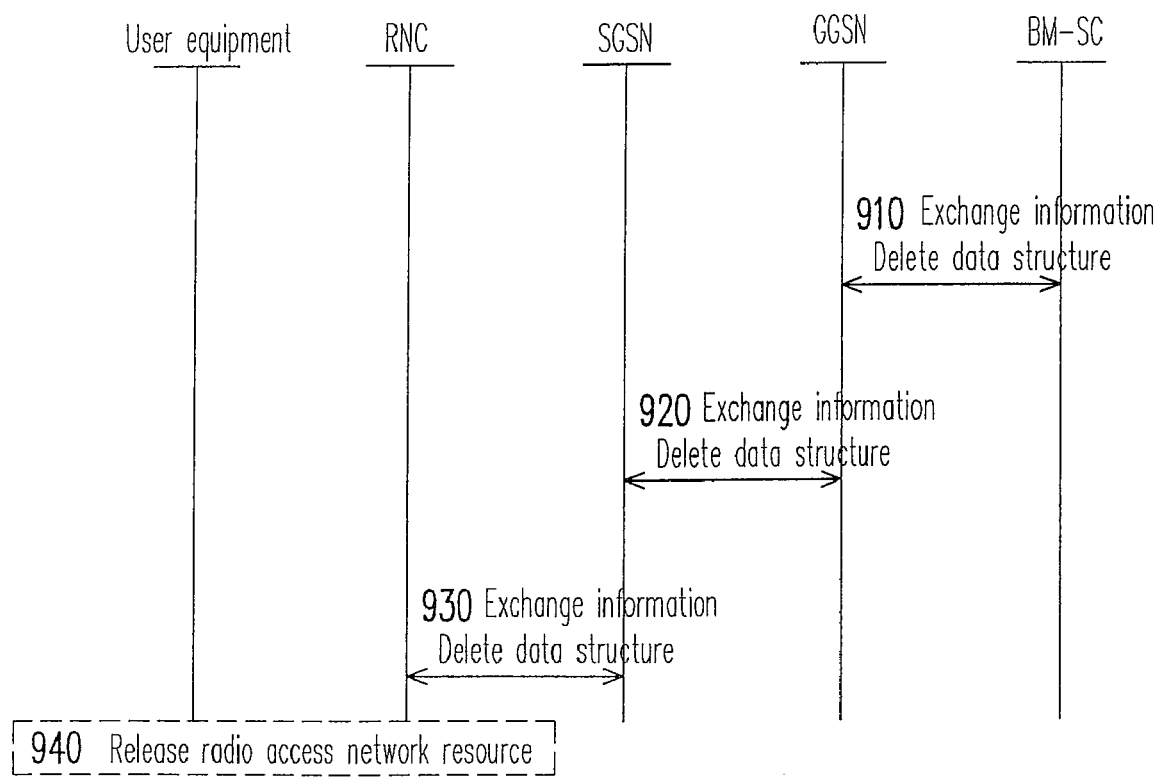
FIG. 9 is a flowchart illustrating data structure deletion according to an embodiment of the present invention.

FIG. 9 is a flowchart illustrating data structure deletion according to an embodiment of the present invention. Referring to FIG. 9, in step 910, BM-SC determines which GGSNs are responsible for transmitting repair blocks according to the data structure stored therein. BM-SC exchanges messages with these GGSNs to release bearer resources and deletes the data structure stored in BM-SC.

Similarly, in step 920, the GGSN identifies which downstream SGSNs assist in the transmission of repair blocks by inspecting the data structure stored in the GGSN and exchanges messages with these SGSNs to release bearer resources between the GGSN and the SGSNs and delete the data structure stored in the GGSN.

In step 930, the SGSN determines that the downstream nodes assisting in the transmission of repair blocks correspond to which RNCs according to the data structure stored in the SGSN, and exchanges messages with these RNCs to release the bearer resources between the SGSN and these RNCs and delete the data structure stored in the SGSN.

Finally, in step 940, the RNC deletes the data structure stored therein and releases the related radio access network resources.

Figure 10:
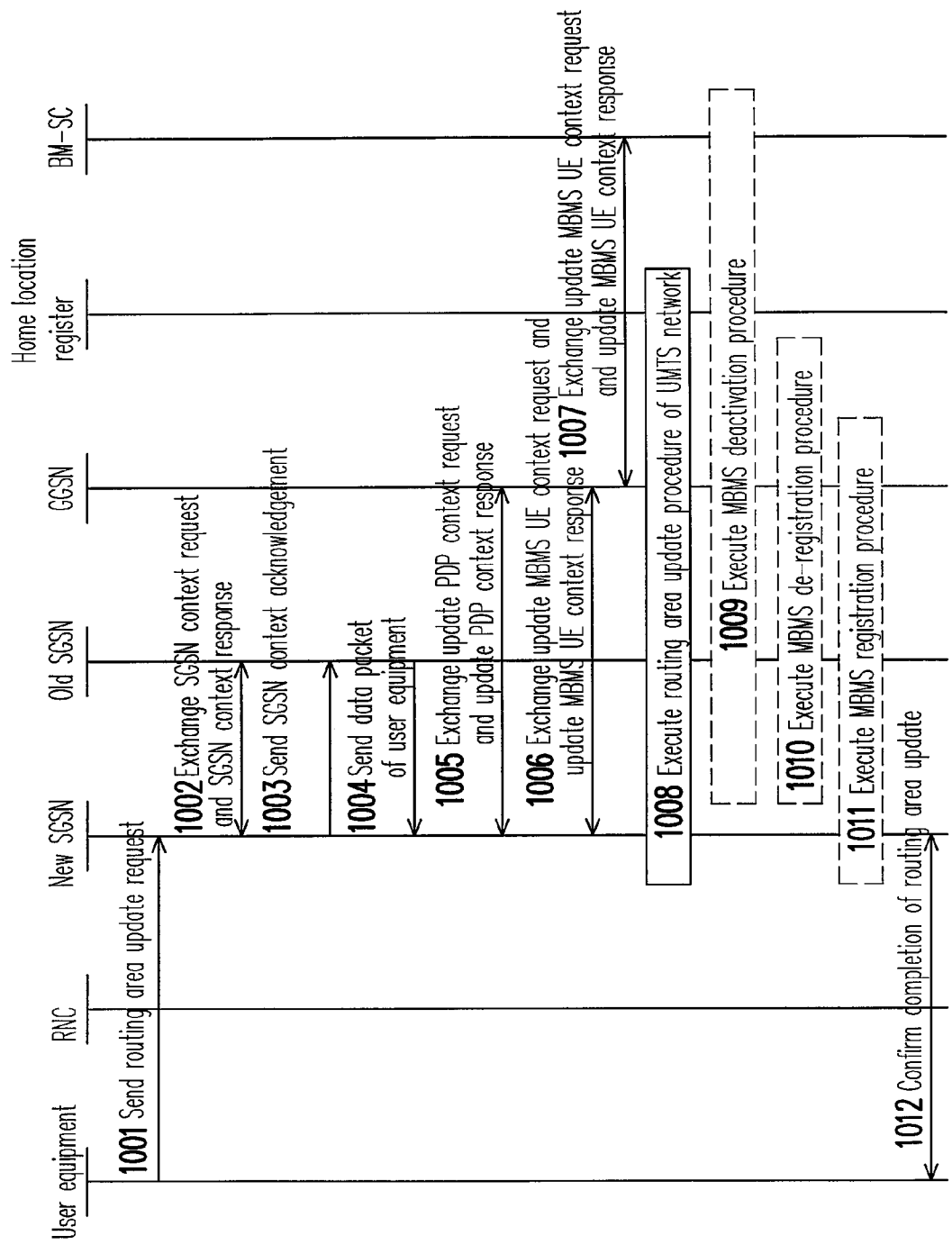
FIG. 10 is a flowchart illustrating updating a routing area and modifying the data structure of a network node according to an embodiment of the present invention.

During the period from the beginning until the end of the repair session, if a user equipment moves to another routing area, the data structures stored in network nodes have to be updated to correctly transmit the repair blocks to the user equipments. FIG. 10 is a flowchart illustrating updating a routing area and modifying the data structure of a network node according to an embodiment of the present invention. In the present embodiment, the data structures of network nodes are updated through a Routing Area Update procedure.

Referring to FIG. 10, first, a user equipment determines whether the routing area wherein it is located has changed according to the Routing Area Identity (RAI) broadcasted periodically by the RNC and the RAI stored in the user equipment. If the routing area has changed, the user equipment sends a Routing Area Update request message to the new SGSN via the RNC (step 1001).

Next, in step 1002, the new SGSN obtains the Mobility Management (MM) context and the Packet Data Protocol (PDP) context of the user equipment by exchanging messages, for example, SGSN context request and SGSN context response messages, with the old SGSN. The old SGSN determines whether the new SGSN supports MBMS through the messages sent by the new SGSN. If the new SGSN supports MBMS, the old SGSN sends the MBMS UE Context of the user equipment and the information of the repair blocks required by the user equipment to the new SGSN. The new SGSN stores the MBMS UE Context and updates the RAI field therein, and then the new SGSN updates or establishes the data structure stored in the SGSN according to the information of the repair blocks required by the user equipment.

Next, the new SGSN notifies the old SGSN that the new SGSN is ready to receive the data packets belong to the user equipment from the old SGSN by sending, for example, a SGSN context acknowledgement message (step 1003).

After receiving the message, the old SGSN starts to send the data packets of the user equipment to the new SGSN (step 1004).

In step 1005, the new SGSN exchanges, for example, update PDP context request and update PDP context response messages with the GGSN to update the PDP context related to the user equipment in the GGSN. Wherein it is denoted that the old SGSN has been replaced by the new SGSN.

If the new SGSN supports MBMS, next, in step 1006, the new SGSN exchanges, for example, update MBMS UE Context request and update MBMS UE Context response messages with the GGSN to update the SGSN address in the MBMS UE Context. Meanwhile, in all the sub-level data structures containing the user equipment in the data structure of the GGSN, the downstream nodes (i.e., SGSNs) thereof which the repair blocks to be sent to have to be changed from old SGSN to new SGSN.

In step 1007, the GGSN exchanges, for example, update MBMS UE Context request and update MBMS UE Context response messages with BM-SC to update the MBMS UE Context stored in BM-SC.

In step 1008, a standard Routing Area Update procedure of UMTS network is executed to notify the Home Location Register (HLR) that the SGSN wherein the user equipment is located has changed.

If in Step 1002, the SGSN Context Request message indicates that the new SGSN does not support the MBMS service, the step 1009 is performed to deactivate the MBSM UE Context for the UE in the old SGSN, GGSNs, and the BM-SC by exercising the MBMS Multicast Service Deactivation procedure.

If the old SGSN does not have any MBMS UE Context for the MBMS service, and the "List of RAs" in the MBMS Bearer Context is empty, the old SGSN initiates the MBMS De-Registration procedure in step 1010 to remove its MBMS Bearer Context and requests the GGSN to remove the identifier of the old SGSN from the "downstream node list" in the GGSN's MBMS Bearer Context.

In step 1011, if the new SGSN supports MBMS, the new SGSN checks whether the MBMS Bearer Contexts for the MBMS services of the user equipment exist. Note that the user equipment may simultaneously subscribe multiple MBMS services (that may be also subscribed by other user equipments), and for a user equipment, there maybe more than one corresponding MBMS Bearer Service Contexts. For each MBMS Bearer Context the new SGSN does not have, the SGSN initiates the MBMS Registration procedure to create the MBMS Bearer Context and request the GGSN to add the identifier of the new SGSN to the "downstream node list" in the GGSN's MBMS Bearer Context.

In step 1012, the new SGSN sends the Routing Area Update Accept message to inform the UE that the RA Update procedure is successfully performed. The Routing Area Update Accept message carries the parameters to indicate whether the new SGSN supports the MBMS service. Upon receipt of the message, the UE judges whether the MBMS service can be received as before. If the new SGSN does not support the MBMS service, the UE removes the MBMS UE Context and quits the MBMS service. Then the UE acknowledges the new SGSN with the Routing Area Update Complete message.

After the user equipment finishes executing the Routing Area Update procedure, the old SGSN removes the MBMS UE Context on the old RNC. As to each repair block required by the user equipment, the old RNC has to remove the user equipment from the data structure. On the other hand, the new SGSN sends the MBMS UE Context to the new RNC, and the new RNC needs to update the data structure thereof, which is, the new RNC adds the user equipment into the sub-level data structures corresponding to the repair blocks required by the user equipment.

Figure 11:
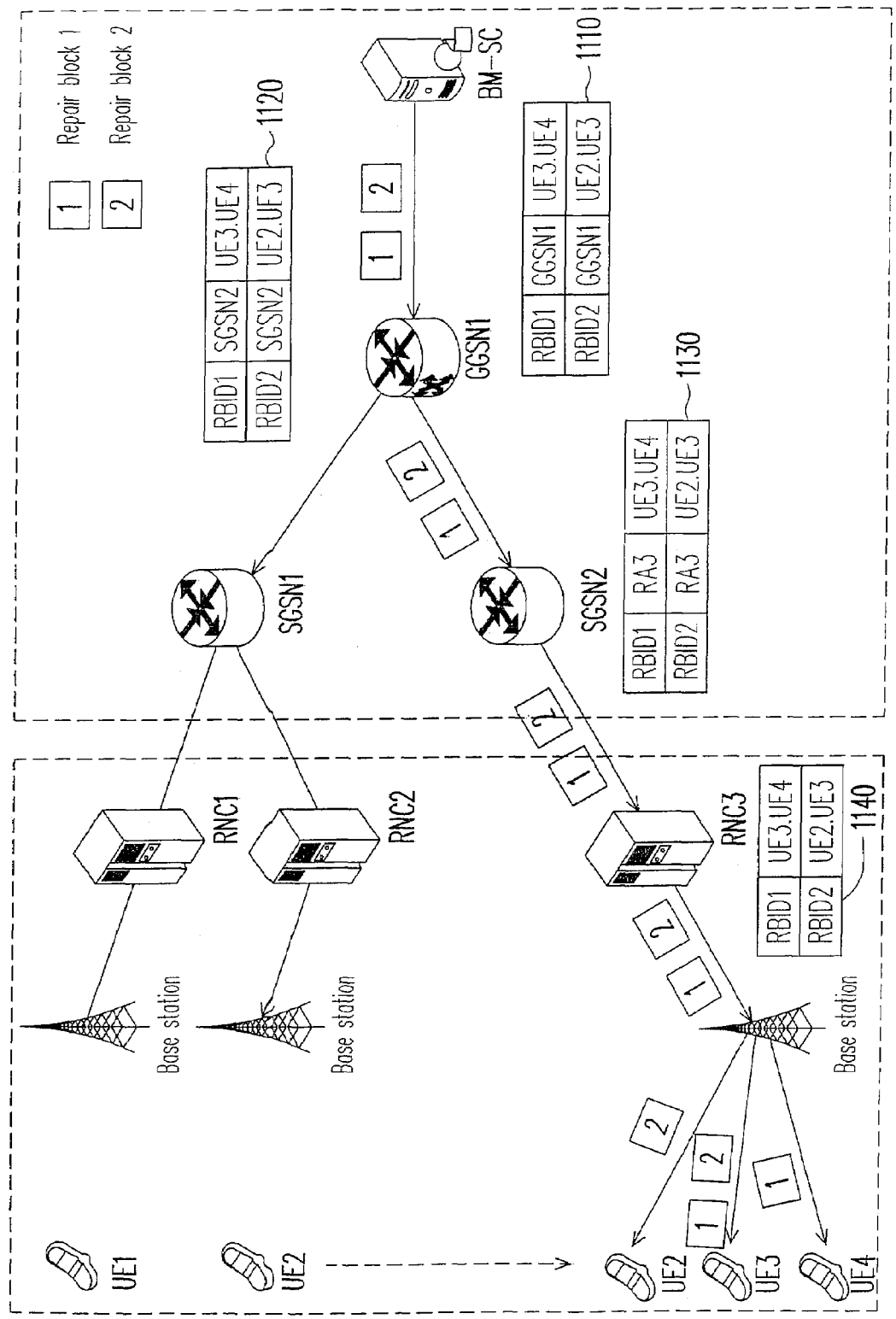
FIG. 11 is a diagram of a UMTS network according to an embodiment of the present invention.

For example, if the user equipment UE2 in FIG. 8 is moved from the routing area 2 connected to SGSN1 to the routing area 3 connected to SGSN2, the changes in the data structures on the network nodes are as shown in FIG. 11. RNC2 and SGSN1 delete the data structures stored therein, and GGSN1, SGSN2, and RNC3 have to update the corresponding data structures because they need to assist in the transmission of the required repair blocks after the user equipment UE2 is moved.

In the embodiment described above, the BM-SC collects the repair request messages sent by user equipments, records the repair blocks requested by the user equipments, establishes the data structure, and then distributes the repair information to each of the downstream network nodes involved in file repair. The BM-SC only sends the repair blocks required by each user equipment to the user equipment according to the data structure, and the user equipment won't receive any unrequested repair block.

Figure 12:
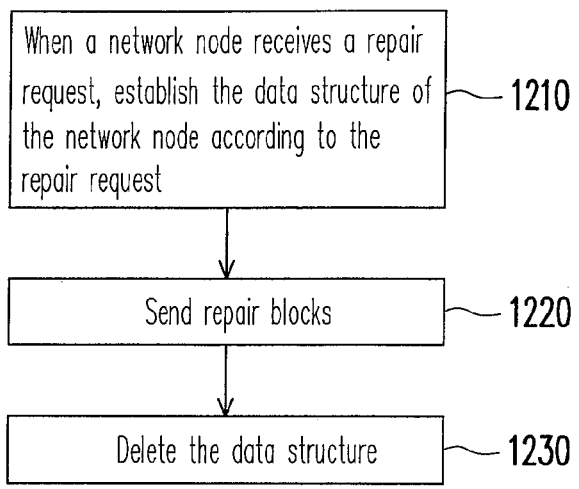
FIG. 12 is a flowchart illustrating another implementation of the file repair method for MBMS according to an embodiment of the present invention.

Another method for establishing data structures on network nodes provided by the present invention will be described below. FIG. 12 is a flowchart illustrating another implementation of the file repair method for MBMS according to an embodiment of the present invention. Referring to FIG. 12, each network node establishes a data structure stored in the network node according to the content of a repair request message sent by a user equipment when the network node receives the repair request message (step 1210).

For the convenience of description, in the present embodiment, data structures stored in various network nodes are generally referred to as corrupted file block routing table (CRT). Wherein the CRT stored in the BM-SC is referred to as $CRT_B$, the CRT stored in GGSN is referred to as $CRT_G$, the CRT stored in SGSN is referred to as $CRT_S$, and the CRT stored in RNC is referred to as $CRT_R$. As to the repair blocks required by each user equipment, $CRT_B$, $CRT_G$, and $CRT_S$ record the downstream nodes which the repair block is to be sent to (which means $CRT_B$, $CRT_G$, and $CRT_S$ respectively record the identification codes of the downstream GGSNs, SGSNs, and routing areas), and $CRT_B$, $CRT_G$, and $CRT_S$ record the number of user equipments that require the repair block in the downstream nodes. $CRT_R$ records the identification code of the user equipment which requires the repair block under the service of the RNC. Besides, to record the identification codes of the repair blocks required by a user equipment, a field of Corrupted File Block list (CFB list) is added to the original MBMS UE Context.

When the RNC receives a repair request message, the RNC captures the identification codes of the repair blocks recorded in the repair request message and fills the identification code of the user equipment into the $CRT_R$ which the required repair blocks belong to sequentially.

When the SGSN receives a repair request message, the SGSN captures the identification codes of the repair blocks recorded in the repair request message and fills the identification codes of the repair blocks into the CFB list in the MBMS UE Context of the user equipment. As to each repair block required by the user equipment, the SGSN checks whether the $CRT_S$ corresponding to the repair block has been established, and two cases will be taken in consideration below.

1. When the $CRT_S$ corresponding to the repair block already exists, first, the SGSN finds out that the user equipment is served by which routing area by inspecting the MBMS UE Context, and then the SGSN checks whether the identification code of the routing area already exists in the $CRT_S$. If the identification code of the routing area already exists, the SGSN increases the number of user equipments in the routing area by 1. If the identification code of the routing area does not exist, the SGSN adds the identification code of the routing area to the $CRT_S$ and sets the number of user equipments in the routing area to 1.

2. When the $CRT_S$ corresponding to the repair block does not exist, the SGSN produces a $CRT_S$ corresponding to the repair block first, and then the SGSN fills the required context into the $CRT_S$ as described above.

When the GGSN (or the BM-SC) receives the repair request, the GGSN (or the BM-SC) respectively produces $CRT_G$ (or $CRT_B$) and the CFB list by the same way of SGSN.

Figure 13:
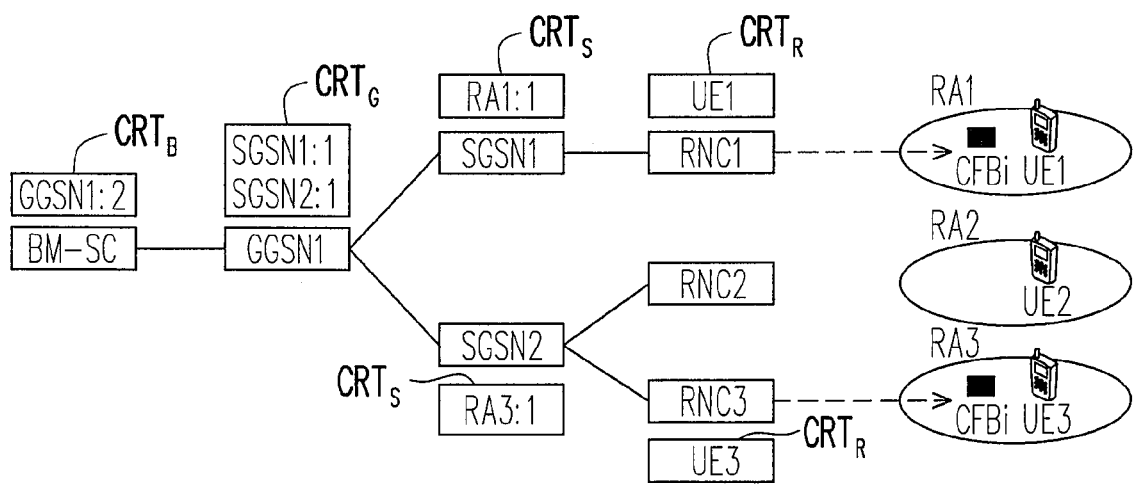
FIG. 13 is a diagram of a UMTS network according to an embodiment of the present invention.

For example, as shown in FIG. 13, it is assumed that the user equipment UE1 and the user equipment UE3 both need the corrupted file block (CFB) i. The two user equipments are respectively located in routing area RA1 and routing area RA3, and routing area RA1 and routing area RA3 are respectively connected to RNC1 and RNC3. Wherein RNC1 is served by SGSN1 and RNC3 is served by SGSN2. SGSN1 and SGSN2 are served by GGSN1. Thus, when the repair request messages of the user equipment UE1 and the user equipment UE3 are sent successfully to the BM-SC, $CRT_B$, $CRT_G$, $CRT_S$, and $CRT_R$ corresponding to CFB i are established, and the contents thereof are as below:

$CRT_B$[BM-SC]={GGSN1:2};
$CRT_G$[GGSN1]={SGSN1:1, SGSN2:1};
$CRT_S$[SGSN1]={RA1:1};$CRT_S$[SGSN2]={RA3:1};
$CRT_R$[RNC1]={UE1};$CRT_R$[RNC3]={UE3}

Next, as shown in step 1220 of FIG. 12, after establishing the data structure stored in each network node (i.e. CRT), the BM-SC, the GGSN, and the SGSN start to send repair blocks to downstream nodes based on the contents of $CRT_B$, $CRT_G$, and $CRT_S$. The RNC sends the repair blocks to the user equipments that require the repair blocks according to $CRT_R$.

How to transmit repair blocks to user equipments with the CRT on network nodes will be described below with reference to FIG. 13. First, the BM-SC searches the $CRT_B$ for the downstream nodes that the repair blocks to be sent to and understands that the repair block CFB i is to be sent to GGSN1.

GGSN1 receives the repair block CFB i from the BM-SC and continues to send the repair block to the downstream node according to $CRT_G$. In the present embodiment, the inquiry result shows that the repair block CFB i has to be sent to SGSN1 and SGSN2, thus, GGSN1 sends the repair block CFB i respectively to SGSN1 and SGSN2.

The two SGSNs in the present embodiment (i.e. SGSN1 and SGSN2) receive the repair block CFB i sent by GGSN1, and respectively send the repair block to the downstream nodes according to the identification codes of downstream nodes recorded in $CRT_S$. With SGSN2 as example, SGSN2 gets to know that the repair block CFB i is to be sent to the routing area RA3 by inquiring $CRT_S$ stored in the SGSN2, assuming that the RNC in the routing area RA3 is RNC3, thus, the repair block CFB i is sent to RNC3.

After receiving the repair blocks sent by the SGSN, the RNC can get to know each repair block has to be sent to which user equipments according to $CRT_R$. With RNC3 as example, RNC3 gets to know that user equipment UE3 requires the repair block CFB i by inquiring $CRT_R$ stored in RNC3, so that RNC3 sends the repair block CFB i to the user equipment UE3.

In the present embodiment, after each network node finishes sending a repair block, the CRT corresponding to the repair block is deleted. Thus, after all the repair blocks are sent, the CRT on every network node does not exist any more (step 1230 in FIG. 12).

Figure 14:
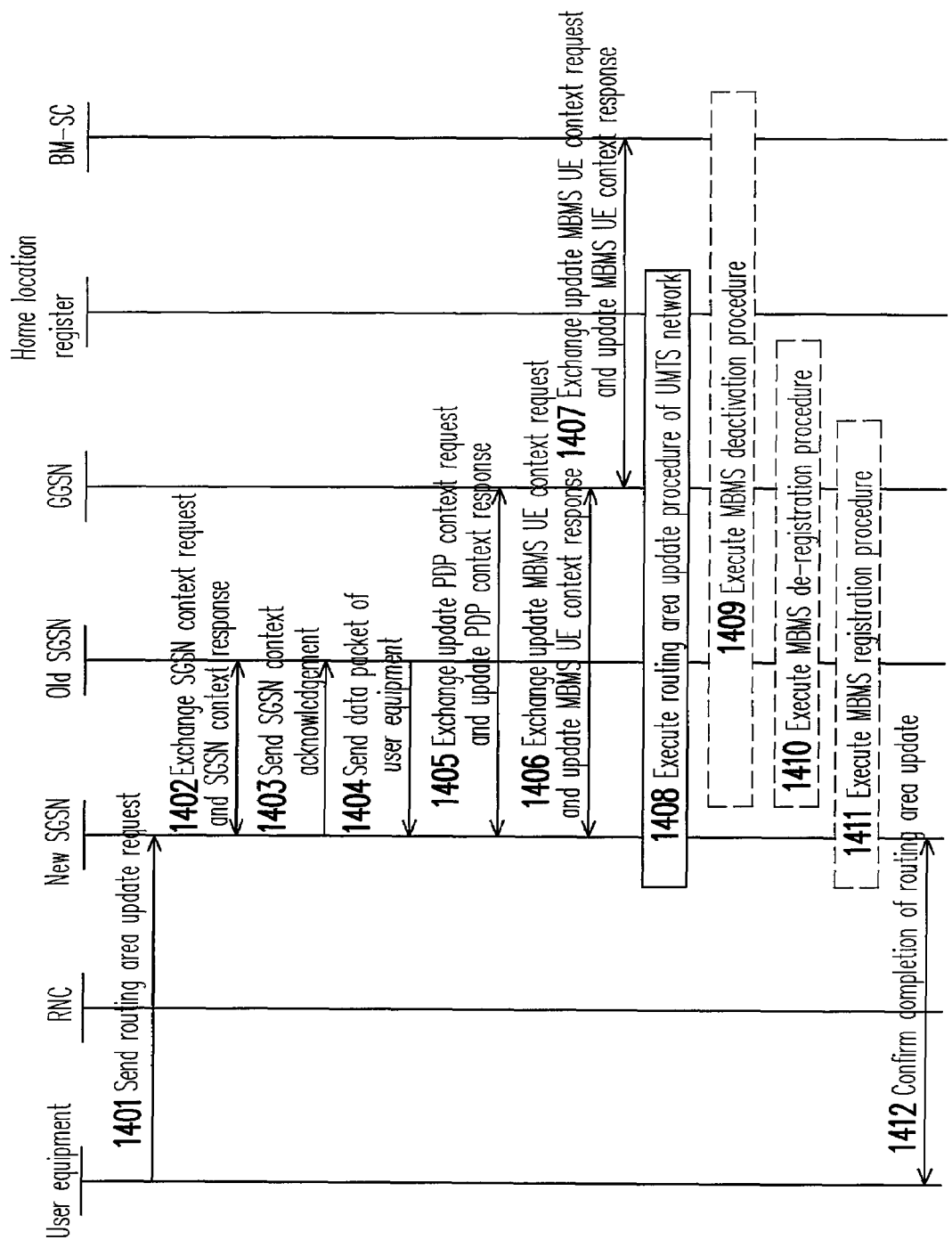
FIG. 14 is a flowchart illustrating updating a routing area and modifying the CRT of a network node according to an embodiment of the present invention.

During the transmission of the repair block, if the user equipment moves to another routing area, the CRT on the network node has to be updated according to the movement result so as to ensure that the repair blocks can still be correctly sent after the user equipment is moved. FIG. 14 is a flowchart illustrating updating a routing area and modifying the CRT of a network node according to an embodiment of the present invention. In step 1401, the user equipment determines whether the routing area wherein the user equipment is located has changed according to the RAI broadcasted periodically in the RNC and the RAI stored in the user equipment. If the routing area has changed, the user equipment sends a Routing Area Update request message to the new SGSN via the RNC.

In step 1402, the new SGSN obtains the MM context and PDP context of the user equipment by exchanging, for example, SGSN context request and SGSN context response messages with the old SGSN. The old SGSN gets to know whether the new SGSN supports MBMS according to the messages sent by the new SGSN. If the new SGSN supports MBMS, the old SGSN sends the MBMS UE Context of the user equipment and the information of the repair blocks required by the user equipment to the new SGSN. The new SGSN stores the MBMS UE Context and updates the RAI field therein. Here the old SGSN finds out which $CRT_S$ need to be updated by using the CFB list in the MBMS UE Context. Then the old SGSN deducts the numbers of user equipments that require the repair block in the old routing area in these $CRT_S$ by 1. If there is already no any user equipment that requires the repair block (which is, the number of user equipments is 0), the old SGSN removes the identification code of the old routing area from the $CRT_S$. The new SGSN also finds out which $CRT_S$ need to be updated by using the CFB list in the MBMS UE Context. Then the new SGSN checks whether the identification code of the new routing area exists in the $CRT_S$. If the routing area exists in the $CRT_S$, the number of user equipments is increased by 1. If the routing area identification code does not exist in the $CRT_S$, the identification code is added into the $CRT_S$ and then the number of user equipments that require the repair block in this routing area is increased by 1.

Next, in step 1403, the new SGSN notifies the old SGSN that the new SGSN is ready to receive data packets belonging to the user equipment from the old SGSN by sending, for example, a SGSN context acknowledgement message.

After receiving the message, the old SGSN starts to send data packets of the user equipment to the new SGSN (step 1404).

In step 1405, the new SGSN exchanges, for example, update PDP context request and update PDP context response messages with the GGSN to update the PDP context related to the user equipment which is stored in the GGSN. Wherein it is denoted that the old SGSN has been replaced by the new SGSN.

If the new SGSN support MBMS, in step 1406, the new SGSN exchanges, for example, update MBMS UE Context request and update MBMS UE Context response messages with the GGSN to update the SGSN address field of the MBMS UE Context stored in the GGSN. In this case, the $CRT_G$ stored in the GGSN has to be updated too, and the GGSN finds out which $CRT_G$ need to be updated by using the CFB list in the MBMS UE Context. Then the numbers of user equipments requiring the repair block in the old SGSN in the $CRT_G$ are deducted by 1. If there is no more user equipment requiring the repair block with this SGSN (i.e., the number of user equipments is 0), the GGSN removes the identification code of the old SGSN from the $CRT_G$. Next, the GGSN checks whether the new SGSN identification code exists in the $CRT_G$. If the new SGSN identification code does not exist, the GGSN adds the new SGSN identification code into the $CRT_G$ and then increases the number of user equipments requiring the repair block in the $CRT_G$ with the new SGSN by 1.

In step 1407, the GGSN exchanges, for example, update MBMS UE Context request and update MBMS UE Context response messages to update the MBMS UE Context stored in the BM-SC.

Next, a standard Routing Area Update procedure of UMTS network is executed to notify the HLR that the SGSN of the user equipment has changed (step 1408).

If in Step 1402, the SGSN Context Request message indicates that the new SGSN does not support the MBMS service, the step 1409 is performed to deactivate the MBSM UE Context for the UE in the old SGSN, GGSNs, and the BM-SC by exercising the MBMS Multicast Service Deactivation procedure.

If the old SGSN does not have any MBMS UE Context for the MBMS service, and the "List of RAs" in the MBMS Bearer Context is empty, the old SGSN initiates the MBMS De-Registration procedure in step 1410 to remove its MBMS Bearer Context and requests the GGSN to remove the identifier of the old SGSN from. the "downstream node list" in the GGSN's MBMS Bearer Context.

In 1411, if the new SGSN supports MBMS, the new SGSN checks whether MBMS Bearer Context. MBMS Bearer Contexts for the MBMS services of the user equipment exist. Note that the user equipment may simultaneously subscribe multiple MBMS services (that may be also subscribed by other user equipments), and for a user equipment, there maybe more than one corresponding MBMS Bearer Service Contexts. For each MBMS Bearer Context the new SGSN does not have, the SGSN initiates the MBMS Registration procedure to create the MBMS Bearer Context and request the GGSN to add the identifier of the new SGSN to the "downstream node list" in the GGSN's MBMS Bearer Context.

Next, in step 1412, the new SGSN sends the Routing Area Update Accept message to inform the UE that the RA Update procedure is successfully performed. The Routing Area Update Accept message carries the parameters to indicate whether the new SGSN supports the MBMS service. Upon receipt of the message, the UE judges whether the MBMS service can be received as before. If the new SGSN does not support the MBMS service, the UE removes the MBMS UE Context and quits the MBMS service. Then the UE acknowledges the new SGSN with the Routing Area Update Complete message.

After the user equipment finishes executing the Routing Area Update procedure, the old SGSN removes the MBMS UE Context on the old RNC. In the present embodiment, the $CRT_R$ stored in the old RNC has to be updated too, which means, as to each repair block required by the user equipment, the old RNC has to remove the identification code of the user equipment from the $CRT_R$. On the other hand, the new SGSN sends the MBMS UE Context to the new RNC, and here the new RNC has to update the $CRT_R$ thereof. As to each of the repair blocks required by the user equipment, the new RNC adds the identification code of the user equipment into the $CRT_R$.

Figure 15:
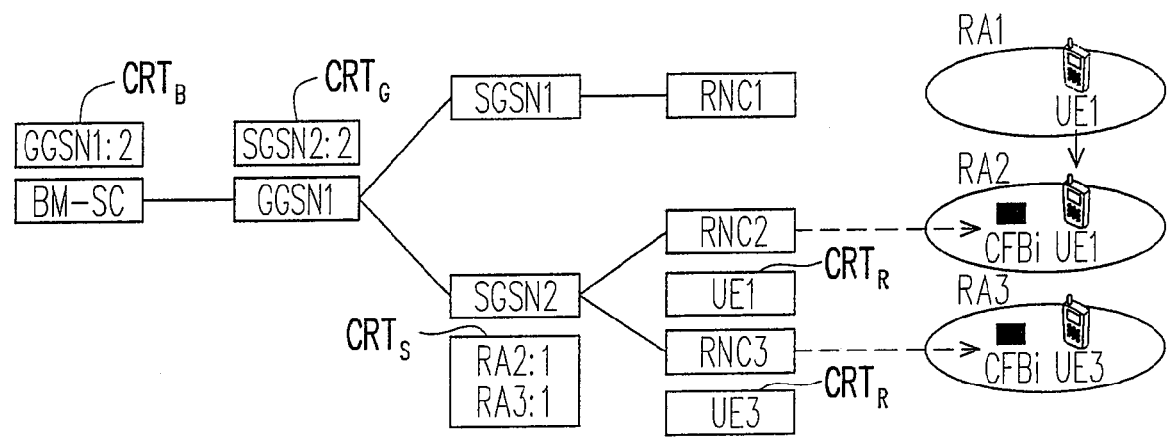
FIG. 15 is a diagram of a UMTS network according to an embodiment of the present invention.

For example, if the user equipment UE1 in FIG. 13 moves from being connected to the routing area RA1 of SGSN1 to being connected to the routing area RA2 of SGSN2, the changes in the CRT of the network nodes after the user equipment moved are as shown in FIG. 15. The $CRT_S$ of GGSN1, SGSN1, and SGSN2 are all changed, and the identification code of the user equipment UE1 is removed from $CRT_R$[RNC1] and added into $CRT_R$[RNC2]. On SGSN1 and RNC1, $CRT_S$ and $CRT_R$ corresponding to the repair block CFB i are also deleted because the number of user equipments is changed to 0.

In the embodiment described above, the data structure stored on the network nodes is established at transmitting the repair request message sent by the user equipment. The BM-SC sends each repair block to the user equipments that require the repair block according to the data structure. Even the routing area wherein the user equipment is located is changed during the procedure, the required repair blocks can still be transmitted correctly.

In overview, according to the file repair method for MBMS and UMTS network of the present invention, a data structure is established according to an repair request message sent by a user equipment, and each repair block is sent to the user equipments that require the repair block with the original MBMS Bearer Service for file downloading according to the data structure established.

The present invention has the advantages of multicasting technique, and network resources won't be wasted on the transmission of the same repair block when a plurality of user equipments request the same repair block.

According to the present invention, a repair block won't be sent to a user equipment that does not require it, so that unnecessary usage of network bandwidth is reduced, and the user equipment does not have to spend extra time and resources for checking whether the received the repair block is required.

According to the present invention, the repair blocks can be transmitted with the original MBMS Bearer Service for file downloading so that the user equipment is not required to join the new multicast group through the MBMS Multicast Service Activation procedure, and the signaling overheads can be reduced.

Generally speaking, in the present invention, no extra signaling overhead is required and each user equipment receives only the repair block it requires, accordingly, network traffic and signal transmission during file repair can be reduced greatly, so that the usage of resources of the core network and the radio access network can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A file repair method for Multimedia Broadcast Multicast Service (MBMS), applicable to a Universal Mobile Telecommunications System (UMTS) network, the method comprising:

establishing a data structure according to a file repair request message sent by a user equipment in the UMTS network, wherein the data structure is stored in each of the network nodes of the UMTS network and the data structure records which downstream nodes of the network node is responsible to transmit which repair blocks; and a Broadcast Multicast-Service Center (BM-SC) of the UMTS network multicasting each of the repair blocks to the user equipments that require the repair block according to the data structure, wherein the data structure is distributed in each of the network nodes which are involved in the file repair;

wherein the network nodes comprise the BM-SC, at least one Gateway GPRS Support Nodes (GGSN), at least one Serving GPRS Support Nodes (SGSN), and at least one Radio Network Controllers (RNC); and wherein the data structure of each of the network nodes comprises at least one sub-level data structure, each of the sub-level data structures corresponds to one of the repair blocks of the network node to be sent to downstream nodes of the network node, each of the sub-level data structures comprises the identification of the corresponding repair block, each of the sub-level data structures of the BM-SC further comprises all the downstream GGSNs which the corresponding repair block to be sent to, each of the sub-level data structures of the GGSN further comprises all the downstream SGSNs which the corresponding repair block to be sent to, each of the sub-level data structures of the SGSN further comprises all the downstream routing areas where the corresponding repair block to be sent to, and each of the sub-level data structures of the RNC further comprises all the downstream user equipments which require the corresponding repair block.

2. The file repair method as claimed in claim 1, further comprising sending the repair blocks with an original MBMS Bearer Service for file downloading.

3. The file repair method as claimed in claim 1, wherein when multicasting the repair blocks, each of the repair blocks is multicasted to user equipments that require the repair block but not to user equipments that have correctly received the repair block.

4. The file repair method as claimed in claim 1, wherein the step of establishing the data structure comprises:

the BM-SC collecting and classifying the file repair request messages to record the user equipments that require each of the repair blocks; and distributing the recorded repair information to the other network nodes to establish the data structure in each of the network nodes involved in the file repair.

5. The file repair method as claimed in claim 1, wherein the step of establishing the data structure comprises:
when each of the network nodes receiving the repair request message, establishing the data structure of the network node according to the received repair request message.

6. The file repair method as claimed in claim 1, further comprising:
the BM-SC sending each of the repair blocks to all the downstream GGSNs in the sub-level data structure corresponding to the repair block;
each of the GGSNs receiving at least one of the repair blocks and sending each of the received repair blocks to all the downstream SGSNs in the sub-level data structure corresponding to the received repair block;
each of the SGSNs receiving at least one of the repair blocks and sending each received repair block to all the RNCs of all the downstream routing areas in the sub-level data structure corresponding to the received repair block; and
each of the RNCs receiving at least one of the repair blocks and sending each received repair block to all the downstream user equipments in the sub-level data structure corresponding to the received repair block.

7. The file repair method as claimed in claim 1, further comprising:
when one of the user equipments moves to another routing area, updating the data structure related to the user equipment in each of the network nodes before and after the user equipment's movement through a Routing Area Update procedure.

8. The file repair method as claimed in claim 7, wherein each sub-level data structure in the data structure of each of the network nodes further comprises the identification of downstream user equipments which require the corresponding repair block, so that the network nodes whose data structures are to be updated when one of the user equipments moves to another routing area can be determined.

9. The file repair method as claimed in claim 7, wherein the data structure of each of the network nodes further comprises a repair block list which records the identification codes of the repair blocks required by each of the user equipments, so that the network node whose data structure is to be updated when the user equipment is moved to another routing area can be determined.

10. A Universal Mobile Telecommunications System (UMTS) network, comprising a plurality of network nodes, storing a data structure established according to a repair request message sent by a user equipment of the UMTS network, the data structure recording each of the network nodes involved in the file repair sending which repair blocks to which downstream nodes of the network node, besides, the Broadcast Multicast-Service Center (BM-SC) of the UMTS network multicasting each of the repair blocks to the user equipments that requires the repair block according to the data structure,
wherein the data structure is distributed in each of the network nodes which are involved in the file repair;
wherein besides the BM-SC, the network nodes further comprise:
at least one Gateway GPRS Support Nodes (GGSN),
at least one Serving GPRS Support Nodes (SGSN), and
at least one Radio Network Controllers (RNC); and
wherein the data structure of each of the network nodes comprises at least one sub-level data structure,
each of the sub-level data structures corresponds to one of the repair blocks to be sent to the downstream nodes by the network node,
each of the sub-level data structures comprises the identification of the corresponding repair block,
each of the sub-level data structures of the BM-SC further comprises all the downstream GGSNs which the corresponding repair block to be sent to,
each of the sub-level data structures of the GGSN further comprises all the downstream SGSNs which the corresponding repair block to be sent to,
each of the sub-level data structures of the SGSN further comprises all the downstream routing areas where the corresponding repair block to be sent to, and
each of the sub-level data structures of the RNC further comprises all the downstream user equipments which require the corresponding repair block.

11. The UMTS network as claimed in claim 10, wherein the repair blocks are sent with an original MBMS Bearer Service for file downloading of the user equipment.

12. The UMTS network as claimed in claim 10, wherein when multicasting the repair blocks, each of the repair blocks is multicasted to the user equipments that require the repair block, but not to the user equipments that have correctly received the file block.

13. The UMTS network as claimed in claim 10, wherein the BM-SC collects and classifies the repair request messages to record each of the repair blocks is required by which user equipments, and the BM-SC distributes the recorded repair information to the other network nodes involved in the file repair to establish the data structure in each of the network nodes.

14. The UNITS network as claimed in claim 10, wherein when each of the network nodes receives "the repair request message, the network nodes" establishes the data structure according to the received repair request message.

15. The UMTS network as claimed in claim 10, wherein the BM-SC sends each of the repair blocks to all the downstream GGSNs in the sub-level data structure corresponding to the repair block;
each of the GGSNs receives at least one of the repair blocks and sends each of the received repair blocks to all the downstream SGSNs in the sub-level data structure corresponding to the received repair block;
each of the SGSNs receives at least one of the repair blocks and sends each of the received repair blocks to all the RNCs of a U the downstream routing areas in the sub-level data structure corresponding to the received repair block; and
each of the RNCs receives at least one of the repair blocks and sends each of the received repair blocks to all the downstream user equipments in the sub-level data structure corresponding to the received repair block.

16. The UMTS network as claimed in claim 10, wherein when one of the user equipments moves to another routing area, the UMTS network updates the data structure related to the user equipment in each of the network nodes before and after the user equipment moves through a Routing Area Update procedure.

17. The UMTS network as claimed in claim 16, wherein each sub-level data structure in the data structure of each of the network nodes further comprises the identification of downstream user equipments which require the corresponding repair block, so that the downstream network nodes in the data structure of the network node to be updated when one of the user equipments moves to another routing area can be determined.

18. The UMTS network as claimed in claim 16, wherein the data structure of each of the network nodes further comprises a repair block list which records the identification of the repair blocks required by each of the user equipments, so that the downstream network nodes in the data structure of the network node to be updated when the user equipment moves to another routing area can be determined.

* * * * *